United States Patent Office 3,403,041
Patented Sept. 24, 1968

3,403,041
ALUMINO-SILICATE PIGMENT AND METHOD
OF MAKING SAME
Sanford C. Lyons, Bennington, Vt., and John H. Chapman, Jeffersonville, Ga., assignors to Georgia Kaolin Company, Elizabeth, N.J., a corporation of New Jersey
Filed Oct. 22, 1965, Ser. No. 501,207
2 Claims. (Cl. 106—288)

ABSTRACT OF THE DISCLOSURE

An alumino-silicate pigment is prepared by (a) delaminating washed coarse kaolin and recovering the delaminated fraction up to 10 microns (E.S.D.), (b) mixing an aqueous slurry of the delaminated fraction with an aqueous slurry of aluminum hydrate in the proportion of about 10 to 1, dry weights and in the absence of any dispersing agent, (c) drying the blend and heating to about 800° C., and (d) cooling and pulverizing the mass.

---

Figure 1:
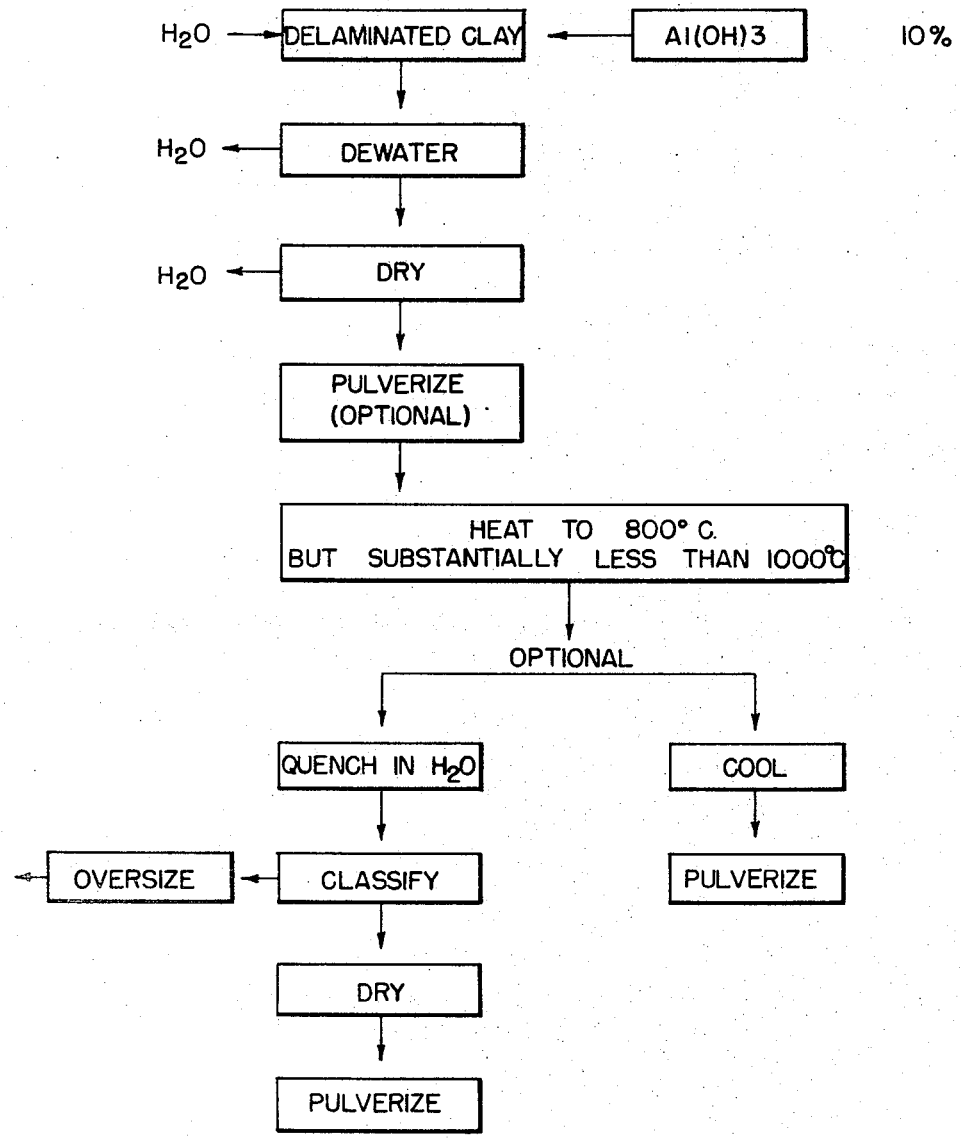

This invention relates to an improved alumino-silicate pigment for paints, and a method of making same. Important properties of pigments for white paint, especially for paints with a latex base, are whiteness, brightness and hiding-power, the last-named property being of particular importance as a measure of the ability of a paint film to cover and conceal a dark surface.

The present discovery is a new development in a process which began with the discovery of a novel and effective way to delaminate large kaolin particles into platelets, such process being described in U.S. Patent No. 2,904,267 granted to Lyons Sept. 15, 1959. The next step was the production of a kaolin product of superior whiteness by fractionating washed clay, delaminating the coarse fraction having not over about 20% fines, and fractionating the treated clay to recover the delaminated fraction, these particles being characterized by having freshly exposed white surfaces which give the product a high degree of whiteness.

It is well known that the brightness of kaolins can in general be improved by calcining, usually at a temperature of about 1000° C., as this temperature has been considered necessary to develop adequate brightness. This fact has been recognized, for example, in the recent patent to Gunn and Morris, No. 3,171,718, column 21, where it is stated that "in general, the clay fraction is calcined by heating to a temperature range of about 980° C. to 1038° C." This treatment, however, produces an abrasive quality in the clay which makes it unsuitable for many uses such for example as a filler or coating material for paper.

In experimenting with delaminated kaolin particles having freshly exposed white surfaces, we have found that adequate brightness can be had by heating the material to a temperature of only about 800° C. or much less than the customary 1000° C. The new pigment thus prepared has been found to yield paints with excellent qualities of brightness, whiteness and hiding-power when compared with the best alumino-silicate pigments heretofore known. When this effect was first noted, it was assumed that it was due to the superior whiteness of the delaminated kaolin, but when such kaolin was used as a pigment without first being heated to about 800° C. it was found to have even less hiding power than natural kaolin of corresponding size distribution.

One practical drawback to this pigment (i.e., freshly delaminated particles heated to about 800° C.) was the tendency on the part of many of the particles to agglomerate in the calcining process and not to separate when the calcined clay was quenched in water in order to prepare it for reclassification. To inhibit this tendency to agglomerate, a small percentage (7% to 10%) of fine crystallized aluminum trihydrate was added to the clay before heating it. To be effective, this material must be added to the clay in a water slurry without the customary addition of a dispersing agent. When this mixture was filtered, dried, pulverized, heated to about 800° C. and quenched, the resulting product was found to have superior qualities as a pigment for paint in hiding power, whiteness, brightness and "flatting" effect.

Figure 2:
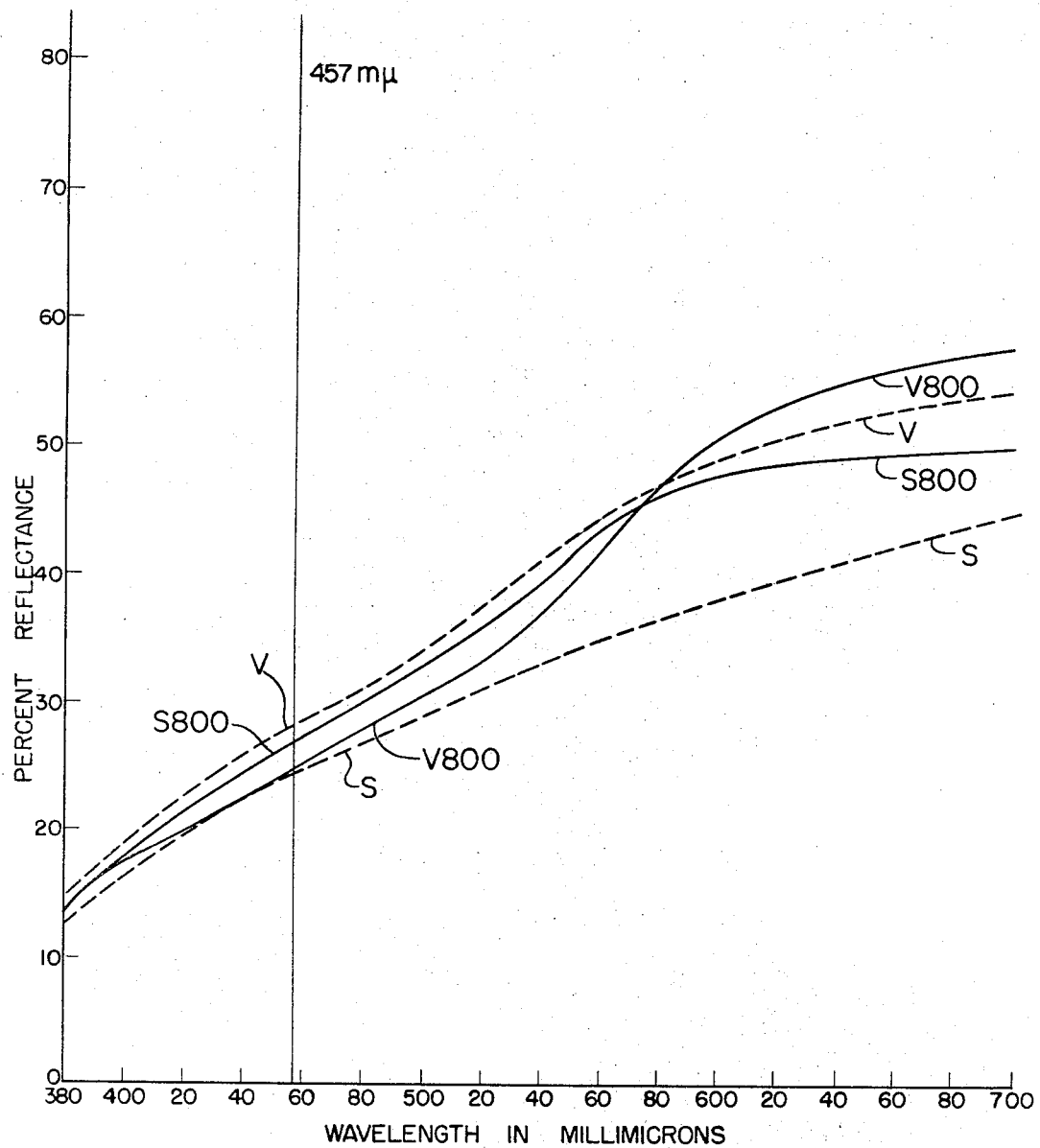

On the drawings:
FIGURE 1 is a flow diagram showing the process steps for obtaining our improved product; and
FIGURE 2 is set of graphs made by a recording spectrophotometer to show the reflectance properties of four kinds of kaolin when individually mixed with tricresyl phosphate (TCP), a colorless liquid having a refractive index 1.56 which is almost identical with that of kaolin.

The process indicated in FIGURE 1 starts with kaolin which has been delaminated by the extrusion process described in U.S. Letters Patent No. 2,904,267. The clay is slurried in water without the addition of any dispersing agent and to it is added an aqueous slurry of fine aluminum trihydrate, i.e., $Al(OH)_3$, the additive material being about 10% of the clay, by dry weight. The mixed slurry is dewatered by filtration, sedimentation or otherwise, then is dried and preferably pulverized. The dry powder is heated to a temperature of from 750° C. to 900° C., care being taken to see that the temperature does not get anywhere near the customary 1000° C. The powder when heated to about 800° C. is then cooled either by quenching in water or by air-cooling. If quenched in water, the resultant slurry is classified for the elimination of oversize particles, e.g., particles larger than 10 microns, E.S.D., and the residue is dried and pulverized by a hammer mill or other suitable apparatus.

While there is not yet complete understanding, nor full agreement, as to the exact nature of all the various changes which occur when a kaolinite crystal is heated progressively from room temperature to 1000° C., it is known that one of the results of this treatment is the complete destruction of the parent kaolinite molecular configuration, with resultant formation of large numbers of hard needle-shaped crystals of mullite (having a square cross-section). If delaminated kaolin slurry is mixed with about 10% (dry weight) of aluminum trihydrate slurry and heated to about 800° C. as hereinbefore described, partial recrystallization of the kaolin takes place with a minor proportion of interspersed aluminum oxide platelets and large numbers of incipient mullite needles intercrystallized between the confronting faces of the aluminum oxide particles and the recrystallized kaolin particles, the needles being embedded in a matrix of crystobalite which is a form of silica.

These incipient mullite needles, as formed at lower temperatures, e.g., 800° C., are very much smaller than are the parent kaolinite crystals from which they derive. Electron micrographs of fully formed mullite needles have been obtained which show them to be often arranged in beautiful configurations reminiscent of a "basket-weaving," with 120° angles between them. One such micrograph was published, facing Page 16 in "Eighth National Conference on Clays and Clay Minerals," 1960, New York, Pergamon Press, and this remarkable orientation of the needles suggests that they may have "grown from rows of aluminum atoms" in hexagonal atomic arrangements in the original kaolinite unit cells.

We have found that mullite needles are of extremely small cross-sectional dimensions when the kaolin is fired to low temperatures, e.g., 800° C., but that they become larger and fewer as the firing temperature is increased and protrude from the surfaces of the parent particles. It is believed that this accounts for the well-known abrasive quality of ordinary calcined kaolin.

It seems probable that the superior hiding power of our novel pigment may derive, at least in part, from the formation of very fine acicular crystals within the parent larger kaolinite crystal, such as these during the recommended firing range.

FIGURE 2 shows the color anlysis curves developed on a recording spectrophotometer for four clay samples each of which had been made into a paste with tricresyl phosphate (TCP). The four clay samples are indicated as follows:

V—natural washed kaolin,
V–800—natural washed kaolin which has been heated to about 800° C.,
S—artificially delaminated kaolin,
S–800—artificially delaminated kaolin which has been heated to about 800° C.

These curves indicate a number of interesting properties of the samples when compounded in a liquid of high refractive index, e.g., tricresyl phosphate. For example, the sample S—while it is the whitest—is, nevertheless, the least opaque and, in a sense, is the most translucent, whereas the sample V is the more opaque of the unheated samples, though its whiteness is not good.

However, the 800° C. calcining produces remarkable and divergent changes in these optical properties.

Samples S–800 becomes more opaque and reflective at 457 m$\mu$, and its whiteness suffers only moderately, whereas V–800 becomes much more reddish and its reflectance at 457 m$\mu$ is materially decreased. The whiteness in each case is indicated inversely on the chart by the vertical distance between the curve point at 700 millimicrons and the point at 400 millimicrons, a shorter such distance indicating a whiter substance. Perfect whiteness would be represented by a horizontal line. The values of brightness and whiteness of the samples indicated on the chart are:

| Sample | Brightness at 457 m$\mu$ | Whiteness index, 700 m$\mu$—400 m$\mu$ |
| --- | --- | --- |
| S | 24.4 | 27.0 |
| S–800 | 26.8 | 31.7 |
| V | 28.1 | 35.6 |
| V–800 | 24.8 | 41.7 |

The graphs, however, do not indicate a very important property of the substances, namely, hiding-power when incorporated in a paint, especially a paint having a latex base. To test for this property, a pigment is blended with $TiO_2$, casein and latex, some other minor ingredients usually being included. A generally used formula for a paint by which pigments are tested is as follows:

| | Grams |
| --- | --- |
| Pigment to be tested | 100 |
| $TiO_2$ (R–901) | 75 |
| Casein, 15% solution | 75 |
| Tetrasodium pyrophosphate (dispersant) | 0.7 |
| Phenylmercuric acetate (preservative) | 1.0 |
| Lecithin (soya derivative) | 1.5 |
| Defoamer 581B (optional proprietary additive) | 1.5 |
| Latex (butadiene-styrene) Genflo 67 | 137.0 |
| $H_2O$ | 137.0 |

These components are thoroughly blended by sufficient stirring and then are screened through a fine sieve.

The paint is applied by an applicator to form a film on a "Morest" chart which is made of strong cardboard faced with a coated surface half of which is very black, the other half being very white. When the paint film, uniformly applie dto both halves, has dried, a direct comparison of the halves indicates visually or instrumentally the hiding power of the paint.

Aluminum trihydrate in pigment form is very white, very bright and has a high gloss, but its hiding power is poor. Blendings of various percentages up to 20% of this trihydrate with delaminated clay, followed by heating to 800° C. indicated that maximum hiding power was had when about 10% of the trihydrate was mixed with the clay. As the sheen was nearly constant for blends from 3% to 20%, the maximum hiding power could thus be had without excessive sheen, this combination of properties being desirable for most house painting.

While the new pigment consisting of a blend of delaminated kaolin with about 10% aluminum trihydrate, mixed in slurry form with no dispersing agent, dried and heated to about 800° C. is not quite as bright as pure $TiO_2$, yet when incorporated as a pigment in paint, its brightness, whiteness and hiding power were found to be superior to a paint in which pure $TiO_2$ was the pigment, and it gave a much better "flatting" effect, that is, producing a low degree of sheen or gloss, the resultant mat surface being often a desired finish.

We claim:

1. The method of preparing an alumino-silicate pigment of superior whiteness, brightness and hiding-power, which comprises delaminating washed kaolin, recovering the fines fraction up to 10 microns (E.S.D.), making an aqueous slurry of the delaminated kaolin, making an aqueous slurry of aluminum hydrate, mixing together the two slurries in the proportion of one part by dry weight of aluminum hydrate to about 10 parts by dry weight of kaolin, dewatering and drying the blended slurry, heating the mixture to a temperature of about 800° C. and cooling and pulverizing the calcined mass.

2. The method of preparing an alumino-silicate pigment as described in claim 1, the calcined mass being cooled by quenching in water, fractionating the mass to eliminate oversize particles, and drying and pulverizing the residue.

References Cited

UNITED STATES PATENTS

| | | | |
| --- | --- | --- | --- |
| 2,904,267 | 9/1959 | Lyons | 106—72 |
| 3,021,195 | 2/1962 | Podschus et al. | 23—110.2 |
| 3,151,993 | 10/1964 | Bundy | 106—308 |
| 3,223,546 | 12/1965 | Hemstock | 106—288 |

JAMES E. POER, *Primary Examiner.*